(12) United States Patent
Lim et al.

(10) Patent No.: US 12,420,827 B2
(45) Date of Patent: Sep. 23, 2025

(54) SYSTEM FOR VERIFYING SENSOR DATA OF AUTONOMOUS VEHICLE AND METHOD THEREOF

(71) Applicants: Hyundai Motor Company, Seoul (KR); Kia Corporation, Seoul (KR); Hyundai Autoever Corp., Seoul (KR)

(72) Inventors: Hong Yeol Lim, Incheon (KR); Bong Ju Kim, Yongin-si (KR)

(73) Assignees: HYUNDAI MOTOR COMPANY, Seoul (KR); KIA CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 213 days.

(21) Appl. No.: 18/068,804

(22) Filed: Dec. 20, 2022

(65) Prior Publication Data
US 2024/0051571 A1  Feb. 15, 2024

(30) Foreign Application Priority Data
Aug. 10, 2022  (KR) .......................... 10-2022-0100083

(51) Int. Cl.
*B60W 60/00* (2020.01)
*G01S 17/931* (2020.01)
*G06V 20/56* (2022.01)
*H04L 9/32* (2006.01)

(52) U.S. Cl.
CPC .......... *B60W 60/001* (2020.02); *G01S 17/931* (2020.01); *G06V 20/56* (2022.01); *H04L 9/3242* (2013.01); *H04L 2209/84* (2013.01)

(58) Field of Classification Search
CPC ..................................................... B60W 60/001
See application file for complete search history.

(56) References Cited

U.S. PATENT DOCUMENTS

| | | | |
|---|---|---|---|
| 9,689,686 B1* | 6/2017 | Carmack | G01S 19/215 |
| 11,544,173 B1* | 1/2023 | Gabrovski | G06F 11/3461 |
| 2017/0032671 A1* | 2/2017 | Toyama | H04L 63/123 |
| 2018/0293740 A1* | 10/2018 | Murray | G06T 7/251 |
| 2019/0019416 A1* | 1/2019 | Perko | G05D 1/0011 |
| 2019/0379683 A1* | 12/2019 | Overby | G06F 9/45533 |
| 2020/0033880 A1* | 1/2020 | Kehl | G06N 3/006 |
| 2020/0159930 A1* | 5/2020 | Venkateswaran | H04L 9/3247 |

(Continued)

OTHER PUBLICATIONS

Kawamoto, Y., et al., "Plug and Play Systems for Quantum Cryptography with Continuous Variables", QFD3-3, International Quantum Electronics Conference, Jul. 11, 2005, 3 pages.

(Continued)

*Primary Examiner* — Jean Paul Cass
(74) *Attorney, Agent, or Firm* — SLATER MATSIL, LLP (57) ABSTRACT

An embodiment system for verifying sensor data of an autonomous vehicle includes an autonomous driving sensor controller configured to generate a first message authentication code (MAC) of a sensor data packet by using a secret key and an autonomous driving controller configured to generate a second MAC of the sensor data packet by using the secret key and compare the first MAC of the sensor data packet received from the autonomous driving sensor controller with the second MAC of the sensor data packet generated by the autonomous driving controller to verify integrity of the sensor data packet.

11 Claims, 5 Drawing Sheets

(56) References Cited

U.S. PATENT DOCUMENTS

2021/0209388 A1* 7/2021 Ciftci .................... G06N 3/045
2023/0022152 A1* 1/2023 Venkateswaran ..... G06F 21/575

OTHER PUBLICATIONS

Lee, Eunjoo, et al., "Quantum Key Distribution System Integrated with IPSec," Convergence Security Journal, vol. 21, Issue 3, Sep. 30, 2021, 11 pages.
Lee, Kyung-Woon, et al., "Plug & Play Quantum Cryptography System," Journal of the Institute of Electronics Engineers of Korea SC, vol. 44, Issue 3, May 25, 2007, 8 pages.
Wikipedia, "BB84," retrieved from https://en.wikipedia/org/w/index.php?title=BB84&oldid=1064796925, Jan. 10, 2022, 2 pages.

* cited by examiner

SYSTEM FOR VERIFYING SENSOR DATA OF AUTONOMOUS VEHICLE AND METHOD THEREOF

CROSS-REFERENCE TO RELATED APPLICATIONS

This application claims the benefit of Korean Patent Application No. 10-2022-0100083, filed on Aug. 10, 2022, which application is hereby incorporated herein by reference.

TECHNICAL FIELD

The present disclosure relates to a system for verifying sensor data of an autonomous vehicle and a method thereof.

BACKGROUND

A powertrain domain, a chassis domain, a body domain, and a multimedia domain driven by electronic control based on various sensors mounted on a vehicle have been expanded, and recently, autonomous vehicles have been experimentally operated. In other words, due to an electronic control unit (ECU) mounted on a vehicle, it is possible to automatically control the overall vehicle including a powertrain domain related to vehicle driving, such as an engine, a transmission, an anti-lock brake system (ABS), and the like, as well as a chassis domain, a body domain, a multimedia domain, and the like.

In addition, an embedded system is applied to a system for electronic control of a vehicle. An embedded system applied to a vehicle, which is a computer system that performs only special functions by embedding software that operates various areas of the vehicle in hardware, has specific requirements, unlike a general personal computer, and is set to perform a predefined task.

Because several ECUs are installed in each domain area in a vehicle, middleware for a vehicle capable of effectively managing each ECU may be applied. There is an automotive open system architecture (AUTOSAR) as a typical vehicle middleware. The AUTOSAR provides a software specification and execution environment for a vehicle designed for common use by automotive manufacturers. As structures of electronic devices mounted on a vehicle become very precise and complex, the AUTOSAR is applied as one of the standardized integrated software platforms to solve the complexity of hardware or software.

Meanwhile, an operating system that guarantees real-time has been developed for the implementation of embedded software mounted on an embedded system for a vehicle, and has been mainly applied to the development of applications for vehicle control. That is, most vehicles have been equipped with a software platform using such an operating system. In addition to the powertrain domain, electronic components for overall vehicle control, such as a chassis domain, a body domain, a multimedia domain, and the like have been applied to most vehicles.

An advanced driver assistance system (ADAS) is applied to an autonomous vehicle, and the mounting of an active control ECU for controlling the ADAS has increased. As the active control ECU, there is an ADAS ECU such as an advanced emergency braking system (AEB) ECU, a smart cruise control (SCC) ECU, a highway driving assist (HDA) ECU, a traffic jam assist (TJA) ECU, a lane keeping assist system (LKA) ECU, a parking assistance system (PAS) ECU, and the like.

Each of the above-described ADAS ECUs is configured to control the powertrain domain, the chassis domain, the body domain and the multimedia domain based on data (hereinafter, referred to as sensor data) measured by sensors installed in each part of a vehicle.

Therefore, confidentiality, integrity, and availability of sensor data are very important. When forgery occurs in sensor data due to hacking, the safety of the autonomous vehicle may not be guaranteed, so a method of verifying the integrity of each sensor data of the autonomous vehicle is required.

The matters described in this background section are intended to promote an understanding of the background of the disclosure and may include matters that are not already known to those of ordinary skill in the art.

SUMMARY

The present disclosure relates to a system for verifying sensor data of an autonomous vehicle and a method thereof. Particular embodiments relate to a technology for verifying the integrity of data (hereinafter, referred to as sensor data) sensed by each sensor of an autonomous vehicle.

Embodiments of the present disclosure can solve problems occurring in the prior art while advantages achieved by the prior art are maintained intact.

An embodiment of the present disclosure provides a system and method for verifying sensor data of an autonomous vehicle capable of verifying the message authentication code (MAC) of each sensor data packet received from a plurality of sensor controllers, and verifying the MAC of an integrated packet received from the autonomous driving domain gateway, thereby verifying the integrity of each sensor data as well as ensuring driving safety of the autonomous vehicle.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a system for verifying sensor data of an autonomous vehicle includes an autonomous driving sensor controller that generates a message authentication code (MAC) of a sensor data packet by using a secret key, and an autonomous driving controller that generates a MAC of the sensor data packet by using the secret key and compares the MAC of the sensor data packet received from the autonomous driving sensor controller with the MAC of the sensor data packet generated by the autonomous driving controller to verify integrity of the sensor data packet.

According to an embodiment, the autonomous driving sensor controller may include a radar controller that generates a first sensor data packet including detection data from a radar sensor and generates a MAC of the first sensor data packet by using a secret key "A", a camera controller that generates a second sensor data packet including detection data from a camera sensor and generates a MAC of the second sensor data packet by using a secret key "B", and a LiDAR controller that generates a third sensor data packet including detection data from a LiDAR sensor and generates a MAC of the third sensor data packet by using a secret key "C".

According to an embodiment, the autonomous driving controller may generate the MAC of the first sensor data packet by using the secret key "A" and compare the MAC of the first sensor data packet received from the radar controller with the MAC of the first sensor data packet generated by the autonomous driving controller to verify integrity of the first sensor data packet, generate the MAC of the second sensor data packet by using the secret key "B" and compare the MAC of the second sensor data packet received from the camera controller with the MAC of the second sensor data packet generated by the autonomous driving controller to verify integrity of the second sensor data packet, and generate the MAC of the third sensor data packet by using the secret key "C" and compare the MAC of the third sensor data packet received from the LiDAR controller with the MAC of the third sensor data packet generated by the autonomous driving controller to verify integrity of the third sensor data packet.

According to an embodiment, the autonomous driving controller may operate a tracking system provided in the autonomous vehicle when the integrity of the first sensor data packet, the integrity of the second sensor data packet, and the integrity of the third sensor data packet are verified.

According to an embodiment, the system may further include an autonomous driving domain gateway that generates a CAN integration packet by integrating the first sensor data packet and the second sensor data packet.

According to an embodiment, the autonomous driving domain gateway may generate the MAC of the first sensor data packet by using the secret key "A" and compare the MAC of the first sensor data packet received from the radar controller with the MAC of the first sensor data packet generated by the autonomous driving domain gateway to verify integrity of the first sensor data packet, generate the MAC of the second sensor data packet by using the secret key "B" and compare the MAC of the second sensor data packet received from the camera controller with the MAC of the second sensor data packet generated by the autonomous driving domain gateway to verify integrity of the second sensor data packet, and generate the MAC of the third sensor data packet by using the secret key "C" and compare the MAC of the third sensor data packet received from the LiDAR controller with the MAC of the third sensor data packet generated by the autonomous driving domain gateway to verify integrity of the third sensor data packet.

According to an embodiment, the autonomous driving domain gateway may generate a MAC of the CAN integration packet by using a secret key "D" and transmit the CAN integration packet and the MAC of the CAN integration packet to the autonomous driving controller.

According to an embodiment, the autonomous driving controller may generate the MAC of the CAN integration packet by using the secret key "D" and compare the MAC of the CAN integration packet received from the autonomous driving domain gateway with the MAC of the CAN integration packet generated by the autonomous driving controller to verify integrity of the CAN integration packet.

According to another embodiment of the present disclosure, a method of verifying sensor data of an autonomous vehicle includes generating, by an autonomous driving sensor controller, a message authentication code (MAC) of a sensor data packet by using a secret key, generating, by an autonomous driving controller, a MAC of the sensor data packet by using the secret key, and verifying, by the autonomous driving controller, integrity of the sensor data packet by comparing the MAC of the sensor data packet received from the autonomous driving sensor controller with the MAC of the sensor data packet generated by the autonomous driving controller.

According to an embodiment, the generating of the MAC by the autonomous driving sensor controller may include generating a first sensor data packet including detection data from a radar sensor and generating a MAC of the first sensor data packet by using a secret key "A", generating a second sensor data packet including detection data from a camera sensor and generating a MAC of the second sensor data packet by using a secret key "B", and generating a third sensor data packet including detection data from the LiDAR sensor and generating a MAC of the third sensor data packet by using a secret key "C".

According to an embodiment, the verifying of the integrity of the sensor data packet may include generating the MAC of the first sensor data packet by using the secret key "A" and verifying integrity of the first sensor data packet by comparing the MAC of the first sensor data packet received from the radar controller with the MAC of the first sensor data packet generated by the autonomous driving controller, generating the MAC of the second sensor data packet by using the secret key "B" and verifying integrity of the second sensor data packet by comparing the MAC of the second sensor data packet received from the camera controller with the MAC of the second sensor data packet generated by the autonomous driving controller, and generating the MAC of the third sensor data packet by using the secret key "C" and verifying integrity of the third sensor data packet by comparing the MAC of the third sensor data packet received from the LiDAR controller with the MAC of the third sensor data packet generated by the autonomous driving controller.

According to an embodiment, the verifying of the integrity of the sensor data packet may further include operating a tracking system provided in the autonomous vehicle when the integrity of the first sensor data packet, the integrity of the second sensor data packet, and the integrity of the third sensor data packet are verified.

According to an embodiment, the generating of the MAC by the autonomous driving sensor controller may further include generating, by an autonomous driving domain gateway, the MAC of the first sensor data packet by using the secret key "A" and comparing the MAC of the first sensor data packet received from the radar controller with the MAC of the first sensor data packet generated by the autonomous driving domain gateway to verify integrity of the first sensor data packet, generating, by the autonomous driving domain gateway, the MAC of the second sensor data packet by using the secret key "B" and comparing the MAC of the second sensor data packet received from the camera controller with the MAC of the second sensor data packet generated by the autonomous driving domain gateway to verify integrity of the second sensor data packet, and generating, by the autonomous driving domain gateway, the MAC of the third sensor data packet by using the secret key "C" and comparing the MAC of the third sensor data packet received from the LiDAR controller with the MAC of the third sensor data packet generated by the autonomous driving domain gateway to verify integrity of the third sensor data packet.

According to an embodiment, the generating of the MAC by the autonomous driving sensor controller may further include generating, by an autonomous driving domain gateway, a CAN integration packet by integrating the first sensor data packet and the second sensor data packet, generating, by the autonomous driving domain gateway, a MAC of the CAN integration packet by using a secret key "D", and transmitting, by the autonomous driving domain gateway, the CAN integration packet and the MAC of the CAN integration packet to the autonomous driving controller.

According to an embodiment, the verifying of the integrity of the sensor data packet may include generating, by the autonomous driving controller, a MAC of the CAN integration packet by using the secret key "D", and verifying, by the autonomous driving controller, integrity of the CAN integration packet by comparing the MAC of the CAN integration packet received from the autonomous driving domain gateway with the MAC of the CAN integration packet generated by the autonomous driving controller.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
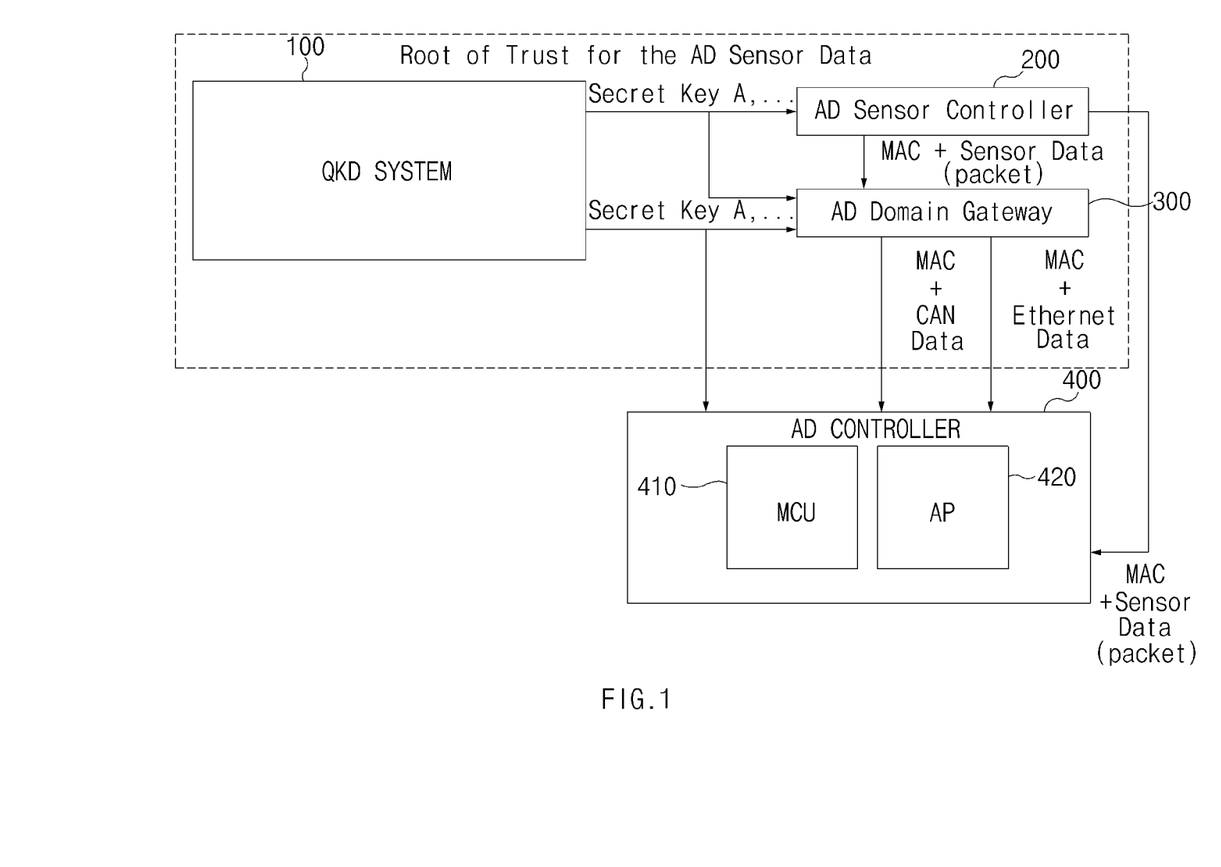
FIG. 1 is a diagram illustrating an overall configuration of a system for verifying sensor data of an autonomous vehicle according to a first embodiment of the present disclosure.

FIG. 1 is a diagram illustrating an overall configuration of a system for verifying sensor data of an autonomous vehicle according to a first embodiment of the present disclosure.

As shown in FIG. 1, a system for verifying sensor data of an autonomous vehicle according to the first embodiment of the present disclosure may include a quantum key distribution (QKD) system 100, an autonomous driving (AD) sensor controller 200, an AD domain gateway 300, and an AD controller 400. In this case, according to a scheme of implementing a system for verifying sensor data of an autonomous vehicle according to an embodiment of the present disclosure, components may be combined with each other to be implemented as one, or some components may be omitted.

Regarding each component, first, the QKD system 100, which is a system in which a transmitter and a receiver securely distribute and own the same quantum encryption key, may provide absolute safety by using principles of quantum mechanics such as superposition in a quantum state, non-replication, and the like.

The QKD system 100 includes a transmitter, a receiver, and a quantum channel, where each of the transmitter and the receiver includes a single photon detector that generates a single photon and an optical interferometer that generates single photon phase modulation and interference. For reference, using a virtual name, the transmitter will be called 'Alice' and the receiver will be called 'Bob'.

In the QKD system 100, Alice randomly modulates the phase or polarization of a single photon by using a quantum random number generator (QRNG), and Bob detects it. In this process, the raw key generated between Alice and Bob finally becomes a secured key through a post-processing process. The post-processing process may include a process of inferring key information so that the raw key matches the encryption key of the sender (sifting), the process of correcting the information so that the transmitter and the receiver can have the same information (information reconciliation), a process of amplifying security (privacy amplification), and an authentication process of confirming whether a legitimate transceiver is correct (authentication).

The AD sensor controller 200 may include an AD sensor controller 200 corresponding to each sensor to control a plurality of sensors mounted on the autonomous vehicle.

The AD sensor controller 200 may generate a sensor data packet including detection data from the sensor.

The AD sensor controller 200 may generate a message authentication code (MAC) of the sensor data packet by using the secret key generated by the QKD system 100. In this case, the AD sensor controller 200 may calculate a hash value of the sensor data packet, and may generate the MAC by encrypting the hash value with the secret key.

The AD sensor controller 200 may transmit the sensor data packet and the MAC of the sensor data packet to the AD domain gateway 300 and the AD controller 400.

Next, the AD domain gateway 300 may generate the MAC of the sensor data packet received from the AD sensor controller 200 by using the secret key generated by the QKD system 100. In this case, the AD domain gateway 300 may calculate a hash value of the sensor data packet received from the AD sensor controller 200 and encrypt the hash value with the secret key, thereby generating the MAC.

When the AD domain gateway 300 receives the sensor data packet from the plurality of AD sensor controllers 200, the AD domain gateway 300 may generate the MAC corresponding to each sensor data packet. In this case, the secret keys used to generate the MAC of each sensor data packet may be different from each other.

The AD domain gateway 300 may verify the integrity of the sensor data packet by comparing the MAC of the sensor data packet received from the AD sensor controller 200 with the MAC of the sensor data packet generated by the AD domain gateway 300. In this case, when the MAC of the sensor data packet received from the AD sensor controller 200 is identical with the MAC of the sensor data packet generated by the AD domain gateway 300, the AD domain gateway 300 may determine that the integrity of the sensor data packet received from the AD sensor controller 200 is verified. Of course, when not identical, it may be determined that the integrity of the sensor data packet received from the AD sensor controller 200 is not verified.

When the integrity of the sensor data packet is verified in this manner, the AD domain gateway 300 may classify the sensor data packets received from the plurality of sensor controllers 200 into controller area network (CAN) data packets and Ethernet data packets. Then, the AD domain gateway 300 may generate a CAN integration packet by integrating the CAN data packets, and may generate an Ethernet integration packet by integrating the Ethernet data packets.

The AD domain gateway 300 may generate the MAC of the CAN integration packet by using the secret key generated by the QKD system 100 and generate the MAC of the Ethernet integration packet by using the secret key generated by the QKD system 100. In this case, the secret key used to generate the MAC of the CAN integration packet may be different from the secret key used to generate the MAC of the Ethernet integration packet. In addition, when there is only one Ethernet data packet, the AD domain gateway 300 does not generate any Ethernet integration packets.

The AD domain gateway 300 may transmit the CAN integration packet, the MAC of the CAN integration packet, the Ethernet integration packet, and the MAC of the Ethernet integration packet to the AD controller 400.

Next, the AD controller 400 may be implemented in the form of hardware or software or may be implemented in a combination of hardware and software.

The AD controller 400 may include a micro control unit (MCU) 410 and an application processor (AP) 420.

The AD controller 400 may generate the MAC of the sensor data packet received from the AD sensor controller 200 by using the secret key generated by the QKD system 100. In this case, the AD controller 400 may calculate a hash value of the sensor data packet received from the AD sensor controller 200 and may generate the MAC by encrypting the hash value with the secret key.

When receiving sensor data packets from a plurality of AD sensor controllers 200, the AD controller 400 may generate a MAC corresponding to each sensor data packet. In this case, the secret keys used to generate the MAC of each sensor data packet may be different from each other.

The AD controller 400 may verify the integrity of the sensor data packet by comparing the MAC of the sensor data packet received from the AD sensor controller 200 with the MAC of the sensor data packet generated by the AD controller 400. In this case, when the MAC of the sensor data packet received from the AD sensor controller 200 is identical with the MAC of the sensor data packet generated by the AD controller 400, the AD controller 400 may determine that the integrity of the sensor data packet received from the AD sensor controller 200 is verified. Of course, when not identical, it may be determined that the integrity of the sensor data packet received from the AD sensor controller 200 is not verified.

Meanwhile, the AD controller 400 may generate the MAC of the CAN integration packet received from the AD domain gateway 300 by using the secret key generated by the QKD system 100. In addition, the AD controller 400 may generate the MAC of the Ethernet integration packet received from the AD domain gateway 300 by using the secret key generated by the QKD system 100. In this case, the secret key used to generate the MAC of the CAN integration packet may be different from the secret key used to generate the MAC of the Ethernet integration packet.

The AD controller 400 may compare the MAC of the CAN integration packet received from the AD domain gateway 300 with the MAC of the CAN integration packet generated by the AD controller 400 to verify the integrity of the CAN integration packet received from the AD domain gateway 300. In this case, when the MAC of the CAN integration packet received from the AD domain gateway 300 is identical with the MAC of the CAN integration packet generated by the AD controller 400, it may be determined that the integrity of the CAN integration packet received from the AD domain gateway 300 is verified. Of course, when not identical, it may be determined that the integrity of the CAN integration packet received from the AD domain gateway 300 is not verified.

The AD controller 400 may compare the MAC of the Ethernet integration packet received from the AD domain gateway 300 with the MAC of the Ethernet integration packet generated by the AD controller 400 to verify the integrity of the Ethernet integration packet received from the AD domain gateway 300. In this case, when the MAC of the Ethernet integration packet received from the AD domain gateway 300 is identical with the MAC of the Ethernet integration packet generated by the AD controller 400, the AD controller 400 may determine that the integrity of the Ethernet integration packet received from the AD domain gateway 300 is verified. Of course, when not identical, it may be determined that the integrity of the Ethernet integration packet received from the AD domain gateway 300 is not verified.

Figure 2:
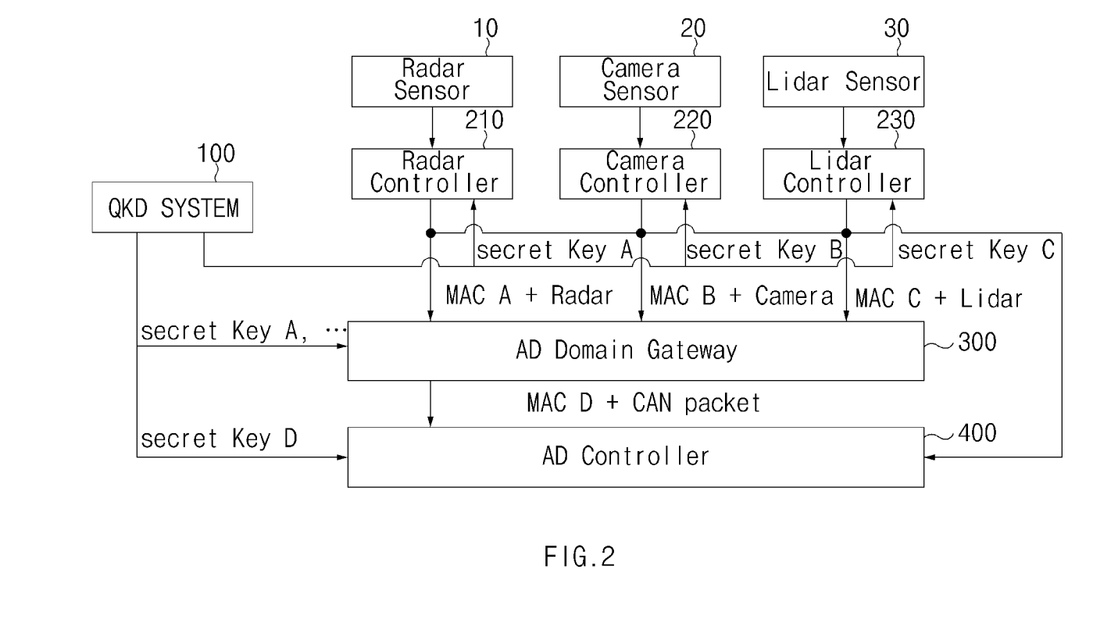
FIG. 2 is a diagram illustrating the detailed configuration of a system for verifying sensor data of an autonomous vehicle according to a first embodiment of the present disclosure.

FIG. 2 is a diagram illustrating the detailed configuration of a system for verifying sensor data of an autonomous vehicle according to a first embodiment of the present disclosure, and the same reference numerals are assigned to the same components as in FIG. 1.

As shown in FIG. 2, the sensors may include a radio detecting and ranging (radar) sensor 10, a camera sensor 20, and a light detection and ranging (LiDAR) sensor 30, and the like. Accordingly, the AD sensor controller 200 may include a radar controller 210, a camera controller 220, and a LiDAR controller 230. In this case, the radar sensor 10 and the camera sensor 20 may be connected to the CAN, and the LiDAR sensor may be connected to the Ethernet.

First, the QKD system 100 may generate secret key "A" and transmit the secret key "A" to the radar controller 210 and the AD domain gateway 300 and generate secret key "B" and transmit the secret key "B" to the camera controller 220 and the AD domain gateway 300. In addition, the QKD system 100 may generate secret key "C" and transmit the secret key "C" to the LiDAR controller 230 and the AD domain gateway 300.

In addition, the QKD system 100 may generate secret key "D" and transmit the secret key "D" to the AD domain gateway 300 and the AD controller 400.

The radar controller 210 may generate a first sensor data packet including detection data from the radar sensor 10 and may generate a MAC of the first sensor data packet by using the secret key "A". In this case, the radar controller 210 may calculate a hash value of the first sensor data packet and encrypt the hash value with the secret key "A" to generate the MAC.

The radar controller 210 may transmit the first sensor data packet and the MAC of the first sensor data packet to the AD domain gateway 300 and the AD controller 400.

The camera controller 220 may generate a second sensor data packet including detection data from the camera sensor 20 and may generate a MAC of the second sensor data packet by using the secret key "B". In this case, the camera controller 220 may calculate a hash value of the second sensor data packet and encrypt the hash value with the secret key "B" to generate the MAC.

The camera controller 220 may transmit the second sensor data packet and the MAC of the second sensor data packet to the AD domain gateway 300 and the AD controller 400.

The LiDAR controller 230 may generate a third sensor data packet including detection data from the LiDAR sensor 30 and may generate a MAC of the third sensor data packet by using the secret key "C". In this case, the LiDAR controller 230 may calculate a hash value of the third sensor data packet and encrypt the hash value with the secret key "C" to generate the MAC.

The LiDAR controller 230 may transmit the third sensor data packet and the MAC of the third sensor data packet to the AD domain gateway 300 and the AD controller 400.

Next, the AD domain gateway 300 may generate the MAC of the first sensor data packet by using the secret key "A". Then, the AD domain gateway 300 may verify the integrity of the first sensor data packet by comparing the MAC of the first sensor data packet received from the radar controller 210 with the MAC of the first sensor data packet generated by the AD domain gateway 300. In this case, when the MAC of the first sensor data packet received from the radar controller 210 is identical with the MAC of the first sensor data packet generated by the AD domain gateway 300, the AD domain gateway 300 may determine that the first sensor data packet received from the radar controller 210 is verified. Of course, when not identical, it may be determined that the integrity of the first sensor data packet received from the radar controller 210 is not verified.

The AD domain gateway 300 may generate the MAC of the second sensor data packet by using the secret key "B". The AD domain gateway 300 may verify the integrity of the second sensor data packet by comparing the MAC of the second sensor data packet received from the camera controller 220 with the MAC of the second sensor data packet generated by the AD domain gateway 300. In this case, when the MAC of the second sensor data packet received from the camera controller 220 is identical with the MAC of the second sensor data packet generated by the AD domain gateway 300, the AD domain gateway 300 may determine the integrity of the second sensor data packet received from the camera controller 220 is verified. Of course, when not identical, it may be determined that the integrity of the second sensor data packet received from the camera controller 220 is not verified.

The AD domain gateway 300 may generate the MAC of the third sensor data packet by using the secret key "C". Then, the AD domain gateway 300 compares the MAC of the third sensor data packet received from the LiDAR controller 230 with the MAC of the third sensor data packet generated by the AD domain gateway 300 to verify the integrity of the third sensor data packet. In this case, when the MAC of the third sensor data packet received from the LiDAR controller 230 is identical with the MAC of the third sensor data packet generated by the AD domain gateway 300, the AD domain gateway 300 may determine that the integrity of the third sensor data packet received from the LiDAR controller 230 is verified. Of course, when not identical, it may be determined that the integrity of the third sensor data packet received from the LiDAR controller 230 is not verified.

When the integrity of the first to third sensor data packets are all verified, the AD domain gateway 300 may integrate the first sensor data packet and the second sensor data packet, which are CAN data packets, to generate a CAN integration packet. In this case, when there is an Ethernet packet as well as the third sensor data packet, the AD domain gateway 300 may generate an Ethernet integration packet.

The AD domain gateway 300 may generate the MAC of the CAN integration packet by using the secret key "D" generated by the QKD system 100. In this case, when the Ethernet integration packet is generated, the AD domain gateway 300 may generate a MAC of the Ethernet integration packet by using the secret key "E" generated by the QKD system 100.

The AD domain gateway 300 may transmit the CAN integration packet and the MAC of the CAN integration packet to the AD controller 400.

Next, the AD controller 400 may generate the MAC of the first sensor data packet by using the secret key "A". In addition, the AD controller 400 may verify the integrity of the first sensor data packet by comparing the MAC of the first sensor data packet received from the radar controller 210 with the MAC of the first sensor data packet generated by the AD controller 400. In this case, when the MAC of the first sensor data packet received from the radar controller 210 is identical with the MAC of the first sensor data packet generated by the AD controller 400, the AD controller 400 may determine that the integrity of the first sensor data packet received from the radar controller 210 is verified. Of course, when not identical, it may be determined that the integrity of the first sensor data packet received from the radar controller 210 is not verified.

The AD controller 400 may generate the MAC of the second sensor data packet by using the secret key "B". Then, the AD controller 400 may compare the MAC of the second sensor data packet received from the camera controller 220 with the MAC of the second sensor data packet generated by the AD controller 400 to verify the integrity of the second sensor data packet. In this case, when the MAC of the second sensor data packet received from the camera controller 220 is identical with the MAC of the second sensor data packet generated by the AD controller 400, it may be determined that the integrity of the data packet received from the camera controller 220 is verified. Of course, when not identical, it may be determined that the integrity of the second sensor data packet received from the camera controller 220 is not verified.

The AD controller 400 may generate the MAC of the third sensor data packet by using the secret key "C". Then, the AD controller 400 may verify the integrity of the third sensor data packet by comparing the MAC of the third sensor data packet received from the LiDAR controller 230 with the MAC of the third sensor data packet generated by the AD controller 400. In this case, when the MAC of the third sensor data packet received from the LiDAR controller 230 is identical with the MAC of the third sensor data packet generated by the AD controller 400, it may determine that the integrity of the third sensor data packet received from the LiDAR controller 230 is verified. Of course, when not identical, it may be determined that the integrity of the third sensor data packet received from the LiDAR controller 230 is not verified.

When the integrity of the first to third sensor data packets are all verified, the AD controller 400 may generate the MAC of the CAN integration packet received from the AD domain gateway 300 by using the secret key "D".

The AD controller 400 may compare the MAC of the CAN integration packet received from the AD domain gateway 300 with the MAC of the CAN integration packet generated by the AD controller 400 to verify the integrity of the CAN integration packet received from the AD domain gateway 300. In this case, when the MAC of the CAN integration packet received from the AD domain gateway 300 is identical with the MAC of the CAN integration packet generated by the AD controller 400, the AD controller 400 may determine that the integrity of the CAN integration packet received from the AD domain gateway 300 is verified. Of course, when not identical, it may be determined that the integrity of the CAN integration packet received from the AD domain gateway 300 is not verified.

Figure 3:
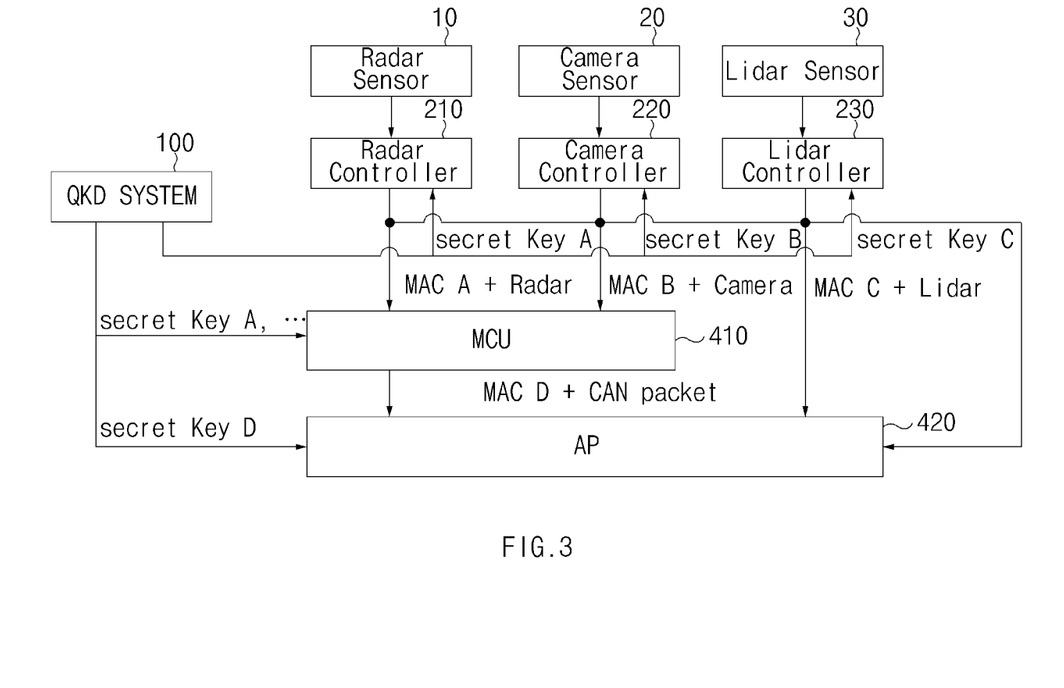
FIG. 3 is a diagram illustrating the detailed configuration of a system for verifying sensor data of an autonomous vehicle according to a second embodiment of the present disclosure.

FIG. 3 is a diagram illustrating the detailed configuration of a system for verifying sensor data of an autonomous vehicle according to a second embodiment of the present disclosure. FIG. 3 illustrates a case in which the AD domain gateway 300 is not provided as compared with FIG. 2. In FIG. 3, the same reference numerals are assigned to the same components as in FIG. 2.

As shown in FIG. 3, an MCU 410 in the AD controller 400 may take over the function of the AD domain gateway 300. In this case, it is preferable that the overlapping verification process between the verification process of the AD domain gateway 300 and the verification process of the AD controller 400 is performed only once.

The result of such a verification process may be used to determine whether to operate a tracking system provided in the autonomous vehicle. For example, when the MAC of the first sensor data packet, the MAC of the second sensor data packet and the MAC of the third sensor data packet are all verified, and the MAC of the CAN integration packet is verified, the operation of the tracking system may be permitted. However, when either MAC is not verified, the operation of the tracking system is not permitted.

For reference, the operation process of the tracking system may include the operations of data association filtering the detection signal received from at least one sensor, managing a track by creating a new track for the filtered signal, maintaining an existing track, or deleting the existing track, clustering the tracks by using a geometric distance, extracting a representative value of the clustered tracks as a unique track, and separating the detection signal by using driving lane coordinates by environment element separation logic.

In this case, the at least one sensor may be a multi-sensor or a single sensor. The multi-sensor may include at least two of a radar, a LiDAR, or a camera. The data association filter may include a Kalman filter.

In addition, the operation of managing a track may include the operations of initializing tracks as many as the number of targets and initializing and updating a potential target. The operation of clustering tracks may include an operation of replacing the geometric distance with an average value of the coordinate values of the tracks within a preset distance. The operation of extracting the unique track may include an operation of initializing the remaining tracks except for one track with respect to the tracks having the same value.

In addition, the representative value may be calculated by dividing the sum of the coordinate values of the tracks whose geometric distance is within a reference value by the number of the clustered tracks.

Figure 4:
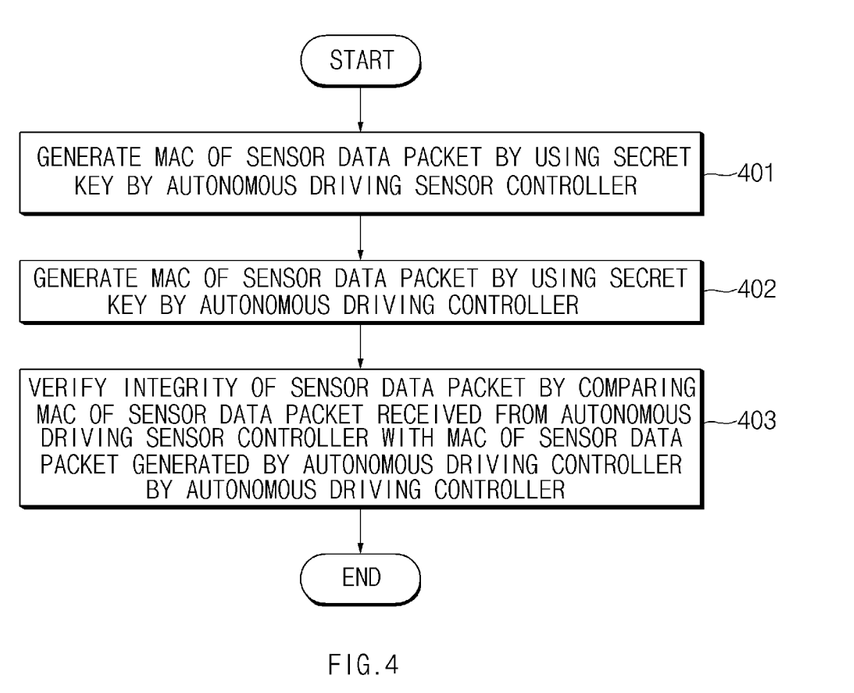
FIG. 4 is a flowchart illustrating a method of verifying sensor data of an autonomous vehicle according to an embodiment of the present disclosure.

FIG. 4 is a flowchart illustrating a method of verifying sensor data of an autonomous vehicle according to an embodiment of the present disclosure.

First, in 401, the AD sensor controller 200 generates the MAC of a sensor data packet by using a secret key.

Then, in 402, the autonomous driving controller 400 generates a MAC of the sensor data packet by using the secret key.

Then, in 403, the autonomous driving controller 400 verifies the integrity of the sensor data packet by comparing the MAC of the sensor data packet received from the AD sensor controller 200 with the MAC of the sensor data packet generated by the autonomous driving controller 400.

Figure 5:
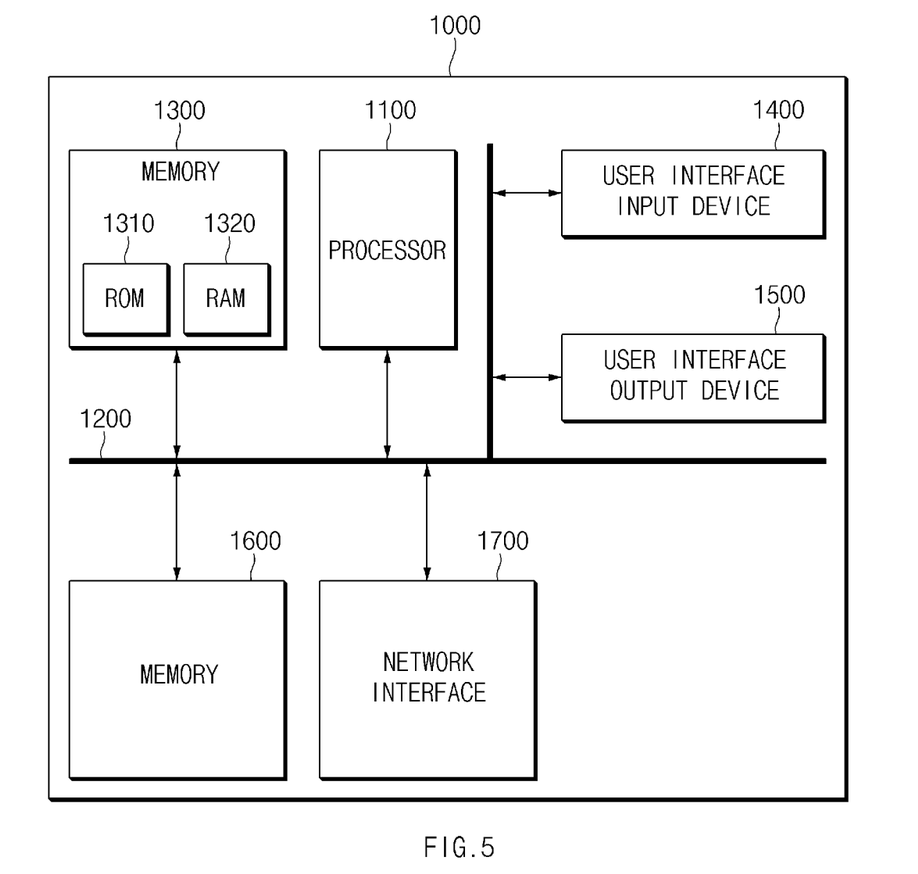
FIG. 5 is a block diagram illustrating a computing system for executing a method of verifying sensor data of an autonomous vehicle according to an embodiment of the present disclosure.

FIG. 5 is a block diagram illustrating a computing system for executing a method of verifying sensor data of an autonomous vehicle according to an embodiment of the present disclosure.

Referring to FIG. 5, the method of verifying sensor data of an autonomous vehicle according to an embodiment of the present disclosure described above may be implemented through a computing system. A computing system moo may include at least one processor 1100, a memory 1300, a user interface input device 1400, a user interface output device 1500, a memory (i.e., a storage) 1600, and a network interface 1700 connected through a system bus 1200.

The processor 1100 may be a central processing device (CPU) or a semiconductor device that processes instructions stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the memory 1600), such as a RAM, a flash memory, a ROM, an EPROM, an EEPROM, a register, a hard disk, a solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments, the system and method for verifying sensor data of an autonomous vehicle may verify the MAC of each sensor data packet received from a plurality of sensor controllers and verify the MAC of an integration packet received from the autonomous driving domain gateway, so that it is possible to verify the integrity of each sensor data as well as ensuring driving safety of the autonomous vehicle.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An autonomous vehicle comprising:
a radar controller to be coupled to a radar sensor and configured to generate a first message authentication code (MAC) that includes radar detection data, the first MAC being generated using a first secret key;
a camera controller to be coupled to a camera and configured to generate a second MAC that includes camera detection data, the second MAC being generated using a second secret key;
a LiDAR controller to be coupled to a LiDAR sensor and configured to generate a third MAC that includes LiDAR detection data, the third MAC being generated using a third secret key;
an autonomous driving controller configured to:
generate a fourth MAC using the first secret key and compare the first MAC with the fourth MAC to verify integrity of the radar detection data;
generate a fifth MAC using the second secret key and compare the second MAC with the fifth MAC to verify integrity of the camera detection data; and
generate a sixth MAC using the third secret key and compare the third MAC with the sixth MAC to verify integrity of the LiDAR detection data; and
an autonomous driving domain gateway configured to:
generate a CAN integration packet by integrating a data packet that includes the radar detection data and a data packet that includes the camera detection data;
generate a ninth MAC of the CAN integration packet using a fourth secret key; and
transmit the CAN integration packet and the ninth MAC to the autonomous driving controller.

2. The autonomous vehicle of claim 1, wherein:
the radar controller is configured to:
generate a first sensor data packet including the radar detection data; and
generate the first MAC as a MAC of the first sensor data packet;
the camera controller is configured to:
generate a second sensor data packet including the camera detection data; and
generate the second MAC as a MAC of the second sensor data packet; and
the LiDAR controller is configured to:
generate a third sensor data packet including the LiDAR detection data; and
generate the third MAC as a MAC of the third sensor data packet.

3. The autonomous vehicle of claim 1, further comprising:
the radar sensor coupled to the radar controller;
the camera coupled to the camera controller; and
the LiDAR sensor coupled to the LiDAR controller.

4. The autonomous vehicle of claim 1, wherein the autonomous driving controller is further configured to operate a tracking system provided in the autonomous vehicle when the integrity of the radar detection data, the integrity of the camera detection data, and the integrity of the LiDAR detection data are verified.

5. The autonomous vehicle of claim 1, wherein the autonomous driving controller is further configured to:
generate a tenth MAC of the CAN integration packet using the fourth secret key; and
compare the ninth MAC with the tenth MAC to verify integrity of the CAN integration packet.

6. The autonomous vehicle of claim 1, wherein the autonomous driving domain gateway is further configured to:
generate a seventh MAC using the first secret key;
compare the first MAC with the seventh MAC to verify the integrity of the radar detection data;
generate an eighth MAC using the second secret key;
compare the second MAC with the eighth MAC to verify the integrity of the camera detection data;
generate a tenth MAC using the third secret key; and
compare the third MAC with the tenth MAC to verify the integrity of the LiDAR detection data.

7. A method of verifying sensor data of an autonomous vehicle, the method comprising:
generating, by an autonomous driving sensor controller, a first message authentication code (MAC) of a sensor data packet by using a secret key;
generating, by an autonomous driving controller, a second MAC of the sensor data packet by using the secret key; and
verifying, by the autonomous driving controller, integrity of the sensor data packet by comparing the first MAC of the sensor data packet received from the autonomous driving sensor controller with the second MAC of the sensor data packet generated by the autonomous driving controller,
wherein generating the first MAC by the autonomous driving sensor controller comprises:
generating a first sensor data packet including first detection data from a radar sensor;
generating a third MAC of the first sensor data packet by using a first secret key;
generating a second sensor data packet including second detection data from a camera sensor;
generating a fourth MAC of the second sensor data packet by using a second secret key;
generating a third sensor data packet including third detection data from a light detection and ranging (LiDAR) sensor; and
generating a fifth MAC of the third sensor data packet by using a third secret key,
wherein generating the first MAC by the autonomous driving sensor controller further comprises:
generating, by an autonomous driving domain gateway, a CAN integration packet by integrating the first sensor data packet and the second sensor data packet;
generating, by the autonomous driving domain gateway, a twelfth MAC of the CAN integration packet by using a fourth secret key; and
transmitting, by the autonomous driving domain gateway, the CAN integration packet and the twelfth MAC of the CAN integration packet to the autonomous driving controller.

8. The method of claim 7, wherein verifying the integrity of the sensor data packet by the autonomous driving controller comprises:
generating a sixth MAC of the first sensor data packet by using the first secret key;
verifying integrity of the first sensor data packet by comparing the third MAC of the first sensor data packet received from a radar controller with the sixth MAC of the first sensor data packet generated by the autonomous driving controller;

generating a seventh MAC of the second sensor data packet by using the second secret key;

verifying integrity of the second sensor data packet by comparing the fourth MAC of the second sensor data packet received from a camera controller with the seventh MAC of the second sensor data packet generated by the autonomous driving controller;

generating an eighth MAC of the third sensor data packet by using the third secret key; and verifying integrity of the third sensor data packet by comparing the fifth MAC of the third sensor data packet received from a LiDAR controller with the eighth MAC of the third sensor data packet generated by the autonomous driving controller.

9. The method of claim 8, wherein verifying the integrity of the sensor data packet by the autonomous driving controller further comprises operating a tracking system provided in the autonomous vehicle when the integrity of the first sensor data packet, the integrity of the second sensor data packet, and the integrity of the third sensor data packet are verified.

10. The method of claim 7, wherein generating the first MAC by the autonomous driving sensor controller further comprises:

generating, by the autonomous driving domain gateway, a ninth MAC of the first sensor data packet by using the first secret key;

comparing the third MAC of the first sensor data packet received from a radar controller with the ninth MAC of the first sensor data packet generated by the autonomous driving domain gateway to verify integrity of the first sensor data packet;

generating, by the autonomous driving domain gateway, a tenth MAC of the second sensor data packet by using the second secret key;

comparing the fourth MAC of the second sensor data packet received from a camera controller with the tenth MAC of the second sensor data packet generated by the autonomous driving domain gateway to verify integrity of the second sensor data packet;

generating, by the autonomous driving domain gateway, an eleventh MAC of the third sensor data packet by using the third secret key; and comparing the fifth MAC of the third sensor data packet received from a LiDAR controller with the eleventh MAC of the third sensor data packet generated by the autonomous driving domain gateway to verify integrity of the third sensor data packet.

11. The method of claim 7, wherein verifying the integrity of the sensor data packet by the autonomous driving controller comprises:

generating, by the autonomous driving controller, a thirteenth MAC of the CAN integration packet by using the fourth secret key; and verifying, by the autonomous driving controller, integrity of the CAN integration packet by comparing the twelfth MAC of the CAN integration packet received from the autonomous driving domain gateway with the thirteenth MAC of the CAN integration packet generated by the autonomous driving controller.

* * * * *